(12) United States Patent
Liao et al.

(10) Patent No.: US 12,410,298 B2
(45) Date of Patent: Sep. 9, 2025

(54) DISPOSAL METHOD FOR WASTE FABRIC CONTAINING POLYESTER, NYLON, AND DYE

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Tzu-Huan Wong, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 855 days.

(21) Appl. No.: 17/690,019

(22) Filed: Mar. 9, 2022

(65) Prior Publication Data

US 2023/0127947 A1    Apr. 27, 2023

Related U.S. Application Data

(63) Continuation-in-part of application No. 17/568,730, filed on Jan. 5, 2022, now Pat. No. 12,269,077.

(30) Foreign Application Priority Data

Oct. 21, 2021   (TW) .................................. 110139088
Jan. 21, 2022   (TW) .................................. 111102618

(51) Int. Cl.
*C08J 11/26*       (2006.01)
*C08J 11/16*       (2006.01)
(Continued)

(52) U.S. Cl.
CPC ................ *C08J 11/26* (2013.01); *C08J 11/16* (2013.01); *D06B 9/04* (2013.01); *D06L 4/13* (2017.01);
(Continued)

(58) Field of Classification Search
CPC . D06P 5/132; D06P 5/135; D06L 4/20; D06B 9/04; C08J 2377/00; C08J 2367/00; C08J 11/26; B29B 2017/0203
See application file for complete search history.

(56) References Cited

U.S. PATENT DOCUMENTS 3,696,058 A    10/1972 Teti
4,783,193 A *  11/1988 Pensa ........................ C08J 7/00
                                                    8/102
(Continued)

FOREIGN PATENT DOCUMENTS

CN        107849206        3/2018
CN        106146877        2/2019
(Continued)

OTHER PUBLICATIONS

Larranaga, M.D., Lewis, R.J., Sr. and Lewis, R.A. (2016). F. In Hawley's Condensed Chemical Dictionary, Sixteenth Edition (eds M.D. Larrañaga, R.J. Lewis and R.A. Lewis). https://doi.org/10.1002/9781119312468.ch6 (Year: 2016).*

(Continued)

*Primary Examiner* — Christina H. W. Rosebach
(74) *Attorney, Agent, or Firm* — JCIPRNET

(57) ABSTRACT

A disposal method for waste fabric containing polyester, nylon, and dye includes the following steps: step (a): providing a waste fabric containing polyester, nylon, and dye; and step (b): performing a first-stage treatment including acid treatment on the waste fabric to obtain a first liquid material and a first solid material. The first-stage treatment includes acid treatment with an acid liquid mixed with an oxidant. The first solid material includes recycled polyester, and/or the first liquid material includes recycled nylon or degraded nylon.

8 Claims, 1 Drawing Sheet

(51) Int. Cl.
  *D06B 9/04* (2006.01)
  *D06L 4/13* (2017.01)
  *D06P 5/13* (2006.01)
  *B29B 17/02* (2006.01)

(52) U.S. Cl.
  CPC ...... *D06P 5/132* (2013.01); *B29B 2017/0203* (2013.01); *C08J 2367/00* (2013.01); *C08J 2377/00* (2013.01); *Y02W 30/66* (2015.05)

(56) References Cited

U.S. PATENT DOCUMENTS

| | | | | |
|---|---|---|---|---|
| 5,241,066 | A * | 8/1993 | Davis | C07D 201/16 540/485 |
| 5,849,804 | A | 12/1998 | Sarian et al. | |
| 5,889,142 | A | 3/1999 | Mohajer et al. | |
| 5,898,063 | A | 4/1999 | Stefandl | |
| 6,140,463 | A | 10/2000 | Stefandl | |
| 2013/0296525 | A1 | 11/2013 | Waibel et al. | |
| 2023/0127947 | A1 | 4/2023 | Liao et al. | |
| 2024/0092991 | A1 * | 3/2024 | Titcomb | D01F 6/62 |

FOREIGN PATENT DOCUMENTS

| | | |
|---|---|---|
| CN | 110790980 | 2/2020 |
| CN | 111621059 | 9/2020 |
| CN | 111868316 | 10/2020 |
| CN | 113073461 | 7/2021 |
| JP | H09255810 | 9/1997 |
| JP | H10195233 | 7/1998 |
| JP | H10512909 | 12/1998 |
| JP | 2018534184 | 11/2018 |

OTHER PUBLICATIONS

Martin, A. Graphic Design and Print Production Fundamentals. Section 4.4 Lab Colour Space and Delta E Measurements. Accessed online at https://opentextbc.ca/graphicdesign/chapter/4-4-lab-colour-space-and-delta-e-measurements/. (Year: 2015).*

"Office Action of Taiwan Counterpart Application", issued on May 15, 2024, p. 1-p. 7.

"Office Action of Taiwan Counterpart Application", issued on Nov. 17, 2022, p. 1-p. 11.

"Office Action of Taiwan Related Application, Application No. 110139088", issued on Sep. 5, 2022, p. 1-p. 6.

"Office Action of Taiwan Related Application, Application No. 111102619", issued on Nov. 17, 2022, p. 1-p. 8.

"Office Action of U.S. Parent Application, U.S. Appl. No. 17/568,730", issued on Nov. 4, 2024, p. 1-p. 30.

* cited by examiner

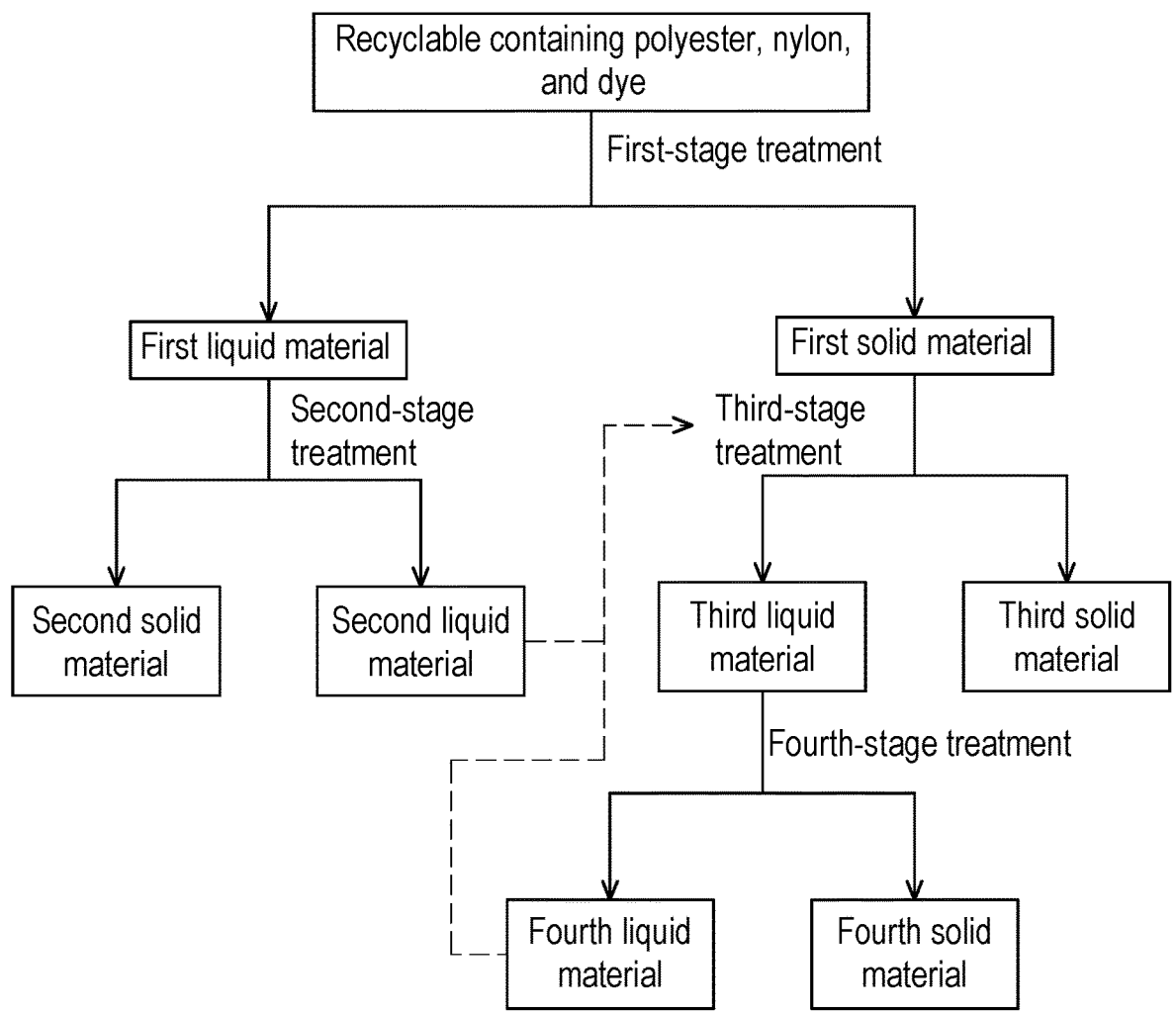

DISPOSAL METHOD FOR WASTE FABRIC CONTAINING POLYESTER, NYLON, AND DYE

CROSS-REFERENCE TO RELATED APPLICATION

This application is a continuation-in-part application of and claims the priority benefit of U.S. patent application Ser. No. 17/568,730, filed on Jan. 5, 2022, now allowed, which claims the priority benefit of Taiwan application serial no. 110139088, filed on Oct. 21, 2021. This application claims the priority benefit of Taiwan application serial no. 111102618, filed on Jan. 21, 2022. The entirety of the above-mentioned patent applications is hereby incorporated by reference herein and made a part of this specification.

BACKGROUND

Technical Field

The disclosure relates to a disposal method for waste fabric, particularly to a disposal method for waste fabric containing polyester, nylon, and dye.

Description of Related Art

Polyester fibers and nylon fibers are fabrics commonly seen in the market and our daily lives. For example, polyester fibers may be co-woven with nylon fibers and then made into all kinds of fabric, such as hats, clothes, pants, skirts, and socks, using conventional approaches in textile or garment industry. It has become a research in progress to recycle polyester and/or nylon in these co-fabrics and/or dispose the polyester wastes.

SUMMARY

The disclosure is directed to a disposal method for waste fabric containing polyester, nylon, and dye which reduces the overall usage amount of acid liquid, increases the recycle amount, and/or improves the quality of polyester and/or nylon.

The disclosure provides a disposal method for waste fabric containing polyester, nylon, and dye, which includes following steps: step (a): providing a waste fabric containing polyester, nylon, and dye; and step (b): performing a first-stage treatment including acid treatment on the waste fabric to obtain a first liquid material and a first solid material. The first-stage treatment includes acid treatment with an acid liquid mixed with an oxidant. The first solid material includes recycled polyester, and/or the first liquid material includes recycled nylon or degraded nylon.

In the disclosure, it is found that decolorization, including the physical removal of dyes from fibers and the removal of chromophores, of the oxidant may be improved in an acidic environment, improving the hue quality of the recycled fibers and increasing the economic value of recycling.

Based on the above description, through the above steps, the disposal method for waste fabric containing polyester, nylon, and dye of the disclosure may reduce the overall usage amount of acid liquid, increase the recycle amount, and/or improve the quality of nylon and/or polyester.

BRIEF DESCRIPTION OF THE DRAWINGS

The FIGURE a partial schematic flowchart of a disposal method for waste fabric containing polyester, nylon, and dye according to an embodiment of the disclosure.

DESCRIPTION OF THE EMBODIMENTS

In the following detailed description, for the sake of explanation and not limitation, exemplary embodiments revealing specific details are set forth to provide a thorough understanding of various principles of the disclosure. However, it is obvious to those skilled in the art that, benefiting from the disclosure, the disclosure may be practiced in other embodiments that depart from the specific details disclosed herein. In addition, the description of well-known devices, methods, and materials may be omitted so as not to obscure the description of various principles of the disclosure.

A range may be expressed herein as from "about" a specific value to "about" another specific value, and may also be directly expressed as a specific value and/or to another specific value. When expressing the range, another embodiment includes from the one specific value and/or to another specific value. Similarly, when the value is expressed as an approximate value by using the antecedent "about," it is understood that the specific value forms another embodiment. It is further understood that an endpoint of each range is obviously related to or independent from the other endpoint.

In the specification, non-limiting terms (such as "possible," "may be," "for example," or other similar terms) are unessential or optional implementations, inclusions, additions or existences.

Unless otherwise defined, all terms (including technical and scientific terms) used herein have the same meaning as commonly understood by one of ordinary skill in the art to which this disclosure belongs. It is further understood that terms, such as those defined in commonly used dictionaries, should be interpreted as having a meaning that is consistent with their meaning in the context of the relevant art and will not be interpreted in an idealized or overly formal sense unless expressly so defined herein.

[Recyclables]

Recyclables containing polyester, nylon, and dye are provided.

In an embodiment, a method of obtaining recyclables includes, for example, collecting various types of recyclables or wastes containing nylon and polyester; and performing corresponding sorting according to types, colors, and/or usage purposes of the aforementioned recyclables. The aforementioned recyclables includes, for example, clothing, but the disclosure is not limited thereto. Generally, a label on regular clothing may indicate a used fiber composition.

In an embodiment, the recyclable containing nylon and polyester may be further subjected to one of following pre-treatments (i.e., the treatments before subsequent treatment; it is essentially still recyclable): removing objects (such as: clips, fasteners, ornaments, labels and/or other objects obviously not containing nylon and polyester) on the recyclable; performing preliminary cleaning on the recyclable (such as washing stains, throwing off impurities, etc., but the disclosure is not limited thereto); using physical processes (such as: shearing, trimming, cutting or chopping, but the disclosure is not limited thereto) to reduce a single size of the recyclable; and/or, drying the recyclable.

In an embodiment, the method of obtaining the recyclable may also include, for example, directly purchasing the processed recyclable containing nylon and polyester (for example, discarded clothing, to which the disclosure is not limited).

It should be noted that the term "nylon" in the specification includes polymers commonly referred to as nylon, such as: nylon 66, nylon 6, nylon 510, nylon 1,6, other similar polymers including polyamide functional groups and similar to the aforementioned polymers, copolymers of the above materials or co-fabrics of the above materials.

It should be noted that the term "polyester" in the specification includes polymers commonly referred to as polyesters, particularly aromatic polyesters, and particularly refers to polyesters derived from purified terephthalic acid (PTA) and ethylene glycol (EG) (i.e., polyethylene terephthalate (PET)).

In addition, the polyester in the specification may also be, for example, polytrimethylene terephthalate, polybutylene terephthalate, polyethylene naphthalate, or a combination thereof materials. In the embodiment, the polyester is preferably polyethylene terephthalate, polytrimethylene terephthalate or a combination thereof. In addition, a copolymer may also be used, which specifically refers to a copolymer that may be obtained by using two or more dicarboxylic acids and/or two or more diol components.

In an embodiment, the dyes used in the fabric are mostly organic dyes. For example, azo dyes (such as monoazo dyes and disazo dyes) are commonly used to dye nylon or polyester. The adhesion of organic dyes to polymers is generally better. Note that the disclosure does not limit the types of the organic dyes.

In an embodiment, the dyes used in the fabric do not contain inorganic dyes as most inorganic dyes contain heavy metal elements, which may easily cause allergies or discomfort to the human body.

[First-Stage Treatment]

A first-stage treatment is performed on the aforementioned recyclable to obtain a first liquid material and a first solid material.

It should be noted that the term "liquid material" used herein is not limited to that the material must be completely liquid. For example, the "liquid material" may include a liquid material; and a suspended substance suspended in or suspended on the liquid. A particle size of the above suspended substance may be 1 millimeter (mm) or less; or, according to the ASTM E11-01 standard, the above suspended substance may pass through a sieve with a mesh number of 18 or greater. For another example, the "liquid material" may include polymer colloid or other similar colloids.

It should be noted that the term "solid material" in the specification is not limited to that the material must be completely solid. For example, the "solid material" may include a solid; and a liquid attached to the solid or located between two solids by capillary phenomena. The "solid material" may be dried by an appropriate method (such as heating and/or vacuum drying) to obtain the solid with almost no liquid. Regarding a total weight of the "solid material," a weight of the solid after drying may be about 80% or more; which is preferably about 90% or more; and more preferably about 95% or more.

In the embodiment, the first-stage treatment may include soaking the recyclables in an acid liquid (which is a process referred to as pickling or acid treatment). For example, the aforementioned recyclables may be immersed in an acid liquid mixed with an oxidant; or, the aforementioned recyclables may be immersed in an acid liquid, before the oxidant is then mixed thereto. And then, the first liquid material and the first solid material may be separated from each other with a suitable process (for example, by filtering with a screen; but the disclosure is not limited thereto).

In an embodiment, in the first-stage treatment, the weight ratio of the recyclables to the acid liquid mixed with an oxidant (i.e., the weight of the recycled product: the weight of the acid liquid mixed with an oxidant) may be about 1:8 to 1:30. Preferably, in the first-stage treatment, the weight ratio of the recyclables to the acid liquid mixed with an oxidant may be about 1:10 to 1:15.

In an embodiment, in the acid treatment of the first-stage treatment, the recyclables may be immersed in an acid liquid mixed with an oxidant and be heated to about 80° C. to 150° C. Preferably, it may be heated to about 90° C. to 140° C. above the glass transition temperature of polyester. If the heating temperature is too low (e.g., less than 80° C.), the capacity utilization rate may be poor due to the slow reaction. And if the heating temperature is too high (e.g., higher than 150° C.), the organic dyes may be decomposed or the decolorization may be carried out poorly (e.g., excessive oxidants causes self-redox reactions), and/or there may be concerns about industrial safety.

In an embodiment, in the acid treatment of the first-stage treatment, the recyclables may be immersed in an acid liquid mixed with an oxidant, stirred and/or left standing for 1 hour or more. Preferably, the stirring and/or standing process takes about 1 hour to 9 hours. More preferably, the stirring and/or standing process takes about 2 hours or more. Even more preferably, the stirring and/or standing process takes about 2 hours to 8 hours.

In an embodiment, in the acid treatment of the first-stage treatment, the recyclables may be immersed in an acid liquid mixed with an oxidant and be heated (the heating temperature may be as described above); in addition, stirring and/or standing (the stirring and/or standing time may be as described above) during the heating process.

In an embodiment, the acid treatment of the first-stage treatment may be performed by using an aqueous solution of an organic acid. If nitric acid, hydrochloric acid, or sulfuric acid is used, it is easy to damage an acid-treatment tank (such as: a pickling tank; but the disclosure is not limited thereto) or other possible metal tools (such as: stainless steel tools; but the disclosure is not limited thereto). The mixture of nitric acid and oxidant is likely to cause industrial safety hazards. Hydrogen chloride gas may be generated easily after hydrochloric acid is heated (e.g., above 80° C.). The sulfuric acid may probably cause dissolving of other non-nylon fibers (such as polyester fibers) to reduce separability between the liquid material and the solid material. Hydrofluoric acid is more likely to cause industrial safety hazards. Oxalic acid has low water solubility (for example, about 14.3 g/100 ml at 25° C.), so that it is difficult to prepare a high-concentration aqueous solution at room temperature to dissolve nylon. Phosphoric acid has poor solubility for nylon.

In an embodiment, the acid treatment of the first-stage treatment may be performed by using an aqueous solution of fatty acid. Aromatic acid (such as benzoic acid; but the disclosure is not limited thereto) has low water solubility, so it is difficult to prepare a high-concentration aqueous solution at room temperature to dissolve nylon. Moreover, compared to nylon, other non-nylon fibers (such as polyester fibers or other polymers containing aromatic groups) may be more difficult to be dissolved by fatty acids.

In an embodiment, the acid treatment of the first-stage treatment may be performed by using an aqueous solution of straight chain fatty acid. Compared with fatty acid with the same carbon number, the straight-chain fatty acid has better water solubility than fatty acid with side chains.

In an embodiment, the acid treatment of the first-stage treatment may be performed by using an aqueous solution of a straight chain fatty acid with a carbon number of 3 or less. The straight chain fatty acid with a carbon number of 3 or less may have better water solubility.

In an embodiment of the disclosure, the acid treatment of the first-stage treatment may be performed by using an aqueous solution of formic acid (i.e., methanoic acid, which may be secreted by hymenoptera such as ants, bees, etc.) or acetic acid (i.e., ethanoic acid, which may be produced by acetic acid bacteria). The formic acid and the acetic acid are biological acids found in nature, and are more eco-friendly in terms of application and/or treatment (such as waste liquid treatment, but the disclosure is not limited thereto).

In an embodiment, the acid treatment of the first-stage treatment may be performed by using an aqueous solution of formic acid. Compared with the acetic acid, the formic acid dissolves nylon more easily.

In an embodiment, in an acid liquid mixed with an oxidant, the acid concentration is about 20 wt % (weight percent) to 95 wt % based on the total composition of the acid liquid mixed with an oxidant. Preferably, the concentration of the acid is about 30 wt % to 90 wt % based on the total composition of the acid liquid mixed with an oxidant.

In an embodiment, the oxidant used in the acid treatment of the first-stage treatment is an inorganic oxidant. Inorganic oxidants may include hydrogen peroxide, chlorates (e.g., sodium chlorate or calcium chlorate), hypochlorite (e.g., calcium hypochlorite) or sodium hypochlorite), perchlorate, ozone, nitric acid, nitrate, perborate (e.g., sodium perborate), permanganate (e.g., potassium permanganate), dichromate (e.g., sodium dichromate), or a combination thereof.

In an embodiment, the inorganic oxidant used in the acid treatment of the first-stage treatment includes hydrogen peroxide, hypochlorite, or ozone. The reduction products of hydrogen peroxide are usually water, oxygen or hydroxide. The hypochlorite reduction product is typically chloride ion. The ozone reduction product is typically oxygen. Hydrogen peroxide, hypochlorite, or ozone are more eco-friendly in application and/or treatment (e.g., waste liquid or waste gas treatment, but the disclosure not limited thereto).

In an embodiment, the oxidant is suitable for oxidizing organic dyes in an acidic environment to decompose or decolorize them. Therefore, the acid liquid containing oxidant has both effects of separation and decolorization on polyester-nylon blended fabrics containing dyes. That is to say, compared with the process of "dissolving or degrading nylon with a solvent without oxidant, and after the polyester-nylon is separated, removing the dye for color removal (using an oxidant, for example)," the method of this embodiment or similar embodiments may further improve the recycling quality of polyester and nylon, and may improve the recycling value.

In an embodiment, in the acid liquid mixed with an oxidant, the concentration of the oxidant is about 0.5 wt % to 10 wt % based on the total composition of the acid liquid mixed with an oxidant. Preferably, the concentration of the oxidant may be about 1 wt % to 8 wt % based on the total composition of the acid liquid mixed with an oxidant. If the concentration of the oxidant is too low (e.g., less than 0.5 wt %), the organic dyes may be decomposed or the decolorization may be carried out poorly. If the concentration of oxidant is too high (e.g., higher than 10 wt %), there may be concerns about industrial safety.

In an embodiment, the oxidant may decompose the organic dye so that it (i.e., the decomposed organic dye) does not have the original color (i.e., the fading of color).

In an embodiment, the oxidant may change part of the functional groups of the organic dye, so that it (i.e., the organic dye after structural modification) may be easily detached from other polymers (such as polyester or nylon) (i.e., decolorization).

In an embodiment, the decomposed or structurally modified organic dye may be more easily dissolved in the solvent by the treatment with the oxidant. For example, decomposed or structurally modified organic dyes may be more readily soluble in water. The acid treatment of the first-stage treatment may be performed by using 99 wt % formic acid aqueous solution.

In an embodiment, the first solid material may include other non-nylon polymers (such as polyester). However, it should be noted that the disclosure does not exclude that the first solid material further includes a small amount of nylon.

In an embodiment, the first liquid may include acid and nylon/degraded nylon, nylon suspension, or degraded nylon suspension dissolved in the acid. However, it should be noted that the disclosure does not exclude that the first liquid material further includes a small amount of non-nylon polymers.

In an embodiment, the first liquid may not contain oxidants. For example, hydrogen peroxide may be decomposed into water and oxygen when heated. For another example, hydrogen peroxide that has not reacted with the dye may be decomposed into water and oxygen when heated.

In an embodiment, regarding a total amount of nylon in the aforementioned recyclable, the amount of nylon in the first liquid material is about 75 wt % to 90 wt %, and the amount of nylon in the first solid material is correspondingly about 25 wt % to 10 wt %.

In an embodiment, the recycle amount or quality of nylon and/or polyester may be improved by the acid liquid mixed with an oxidant.

In an embodiment, the color of the recycled polyester may be close to white. According to the International Commission on Illumination (CIE), based on the CIE 1931 color space, if the color brightness (i.e., the L* value) of the recycled material containing polyester, nylon, and dyes is about 20, then the color brightness of the polyester recovered by the above method may be about 75 or more, the a* value may be about −4 to +4, and the b* value may be about −8 to +8.

In an embodiment, the utilization value of recycled materials (e.g., recycled nylon and/or recycled polyester) may be increased by improving the whiteness.

[Second-Stage Treatment]

In an embodiment, a second-stage treatment may be performed on the aforementioned first liquid material to obtain a second liquid material and a second solid material.

In an embodiment, the second-stage treatment may include dilution. For example, a solvent (such as water) used in the acid treatment in the aforementioned first-stage treatment may be added to the first liquid material, and then the second liquid material and the second solid material may be separated from each other by an appropriate method (such as: filtering with a screen or standing still for separation, but the disclosure is not limited thereto).

In an embodiment, the method of the second-stage treatment may further include cooling the solution after adding the aforementioned solvent to the aforementioned first liquid material (for example, cooling to the room temperature (about 25° C.); or, cooling to below the room temperature and above the freezing point), but the disclosure is not limited thereto.

In an embodiment, the method of the second-stage treatment may further include stirring and/or leaving the solution to stand still (for example: stirring for 3 minutes and standing still for 30 minutes or more, or, stirring for 5 minutes and standing still for 60 minutes or more) after adding the aforementioned solvent to the aforementioned first liquid material, but the disclosure is not limited thereto.

In an embodiment, the first-stage treatment may include performing the acid treatment of the first-stage treatment by using an aqueous solution containing oxidant and 20 wt % to 99 wt % formic acid, and the second-stage treatment may include adding water to the aforementioned first liquid material to reduce a concentration of the formic acid in the solution to about 20 wt % or lower.

In an embodiment, the second solid material may include nylon.

In an embodiment, the second liquid material may include acid liquid and nylon/degraded nylon, nylon suspension, or degraded nylon suspension dissolved in the acid liquid. A concentration of an acidic substance in the second liquid material is lower than a concentration of an acidic substance in the first liquid material.

In an embodiment, it is possible that the second liquid material does not contain oxidant.

[Third-Stage Treatment]

In an embodiment, a third-stage treatment may be performed on the aforementioned first solid material to obtain a third liquid material and a third solid material.

In an embodiment, the third-stage treatment may include acid treatment. In an embodiment, a method of the acid treatment of the third-stage treatment may be similar to the method of the acid treatment of the first-stage treatment. For example, the aforementioned first solid material may be immersed in acid liquid, and then the third liquid material and the third solid material may be separated from each other by a suitable method (such as filtering with a screen, but the disclosure is not limited thereto).

In an embodiment, the acid treatment of the third-stage treatment may be to immerse the first solid material in acid liquid for heating (for example, heated to about 70±5° C. to 100±5° C.), but the disclosure is not limited thereto.

In an embodiment, the acid treatment of the third-stage treatment may be to immerse the first solid material in acid liquid and stir and/or leave for standing still (for example, stirring and/or standing still for more than 30 minutes; or, stirring and/or standing still for more than 60 minutes), but the disclosure is not limited thereto.

In an embodiment, a solute and solvent used in the acid treatment of the third-stage treatment may be the same or similar to the solute and solvent used in the acid treatment of the first-stage treatment.

In an embodiment, an acid concentration of the acid treatment in the third-stage treatment is different from the acid concentration of the acid treatment in the first-stage treatment; and the acid concentration of the acid treatment in the third-stage treatment is different from the acid concentration of the second liquid material.

In an embodiment, the acid concentration of the acid treatment in the third-stage treatment is less than the acid concentration of the acid treatment in the first-stage treatment; and the acid concentration of the acid treatment in the third-stage treatment is greater than the acid concentration of the second liquid material.

In an embodiment, the concentration of the oxidant used in the acid treatment in the third-stage treatment may be less than 0.5 wt %. In an embodiment, it is possible that the solvent used in the acid treatment in the third-stage treatment does not contain oxidant.

In an embodiment, 99 wt % formic acid aqueous solution may be first mixed with a recycled formic acid aqueous solution with a concentration of about 20 wt % or less, and then the aforementioned mixed solution may be used as acid liquid for the acid treatment of the third-stage treatment, such that an overall usage amount of formic acid may be reduced. In an embodiment, a concentration of the formic acid in the aforementioned mixed solution may be 80 wt % or more, which may have a better dissolving effect on nylon.

In an embodiment, the aforementioned recycled formic acid aqueous solution may include the second liquid material obtained by performing the second-stage treatment (including: the second liquid material obtained in the current treatment cycle; and/or the second liquid material obtained in the previous treatment cycles after the method of the disclosure is performed by multiple times); and/or, a fourth liquid material obtained after a fourth-stage treatment (details thereof are as follows) performed in the previous treatment cycles (the method of the disclosure is performed by multiple times). In this way, the overall usage amount of the formic acid may be reduced, and the nylon/degraded nylon, nylon suspension, or degraded nylon suspension dissolved in the acid liquid of the recycled formic acid aqueous solution (such as the second liquid material and/or the fourth liquid material) may be further subsequently recycled, so as to increase the recycle amount of nylon.

For example, a disposal method for waste fabric containing polyester, nylon, and dyes may include the following steps: step (a): providing a waste fabric containing polyester, nylon, and dyes; step (b): performing a first-stage treatment including acid treatment on the waste fabric to obtain a first liquid material and a first solid material; step (c): performing a second-stage treatment on the first liquid material to obtain a second liquid material and a second solid material; and step (d): performing a third-stage treatment on the first solid material to at least obtain a third liquid material. During the processes, step (a), step (b), and step (d) may be performed N times, where N is greater than or equal to 1; step (c) may be performed M times, where M is less than or equal to N; and the acid treatment of the N-th third-stage treatment includes performing an acid treatment with the M-th second liquid material.

For another example, a disposal method for waste fabric containing polyester, nylon, and dyes may include the following steps: step (a): providing a waste fabric containing polyester, nylon, and dyes; step (b): performing a first-stage treatment including acid treatment on the waste fabric to obtain a first liquid material and a first solid material; step (c): performing a second-stage treatment on the first liquid material to obtain a second liquid material and a second solid material; step (d): performing a third-stage treatment on the first solid material to at least obtain a third liquid material; and step (e): performing a fourth-stage treatment on the third liquid material (whose details are described later) to obtain a fourth liquid material and a fourth solid material. During the processes, step (a), step (b), step (d), and step (e) may be performed N times, where N is greater than or equal to 2; and the acid treatment of the N-th third-stage treatment includes performing an acid treatment with the P-th fourth liquid, wherein P is smaller than N.

In an embodiment, the third solid material may include other non-nylon polymers (such as polyester). However, it should be noted that the disclosure does not exclude that the third solid material further includes of a very small amount of nylon.

In an embodiment, a proportion of nylon in the third solid material (which may be a weight ratio of nylon to the entire third solid material) is less than a proportion of nylon in the first solid material (which may be a weight ratio of nylon to the entire first solid material).

In an embodiment, a proportion of polyester in the third solid material (which may be a weight ratio of polyester to the entire third solid material) is greater than a proportion of polyester in the first solid material (which may be a weight ratio of polyester to the entire first solid material).

In an embodiment, the third liquid material may include acid liquid and nylon/degraded nylon, nylon suspension, or degraded nylon suspension dissolved in the acid liquid.

In an embodiment, regarding a total amount of nylon in the first solid material, the amount of nylon in the third liquid material may be about 90 wt % or more; or 95 wt % or more. In other words, through the two-stage acid treatment (i.e., the acid treatment in the first-stage treatment and the acid treatment in the third-stage treatment), the nylon in the aforementioned recyclable may almost be dissolved or degraded and thus separated in the subsequent steps.

[Fourth-Stage Treatment]

In an embodiment, a fourth-stage treatment may be performed on the aforementioned third liquid material to obtain a fourth solid material and a fourth liquid material.

In an embodiment, the fourth-stage treatment may include dilution. For example, a solvent used in the acid treatment in the aforementioned first-stage treatment or the aforementioned third-stage treatment may be added to the third liquid material, and then the fourth liquid material and the fourth solid material may be separated from each other by an appropriate method (such as: filtering with a screen or standing still for separation, but the disclosure is not limited thereto).

In an embodiment, the method of the fourth-stage treatment may further include cooling the solution after adding the aforementioned solvent to the aforementioned third liquid material (for example, cooling to the room temperature (about 25° C.); or, cooling to below the room temperature and above the freezing point), but the disclosure is not limited thereto.

In an embodiment, the method of the fourth-stage treatment may further include stirring and/or leaving the solution to stand still (for example: stirring for 3 minutes and standing still for 30 minutes or more, or, stirring for 5 minutes and standing still for 60 minutes or more) after adding the aforementioned solvent to the aforementioned third liquid material, but the disclosure is not limited thereto.

In an embodiment, the first-stage treatment may include performing the acid treatment of the first-stage treatment by using an aqueous solution containing oxidant and 20 wt % to 95 wt % formic acid, and the third-stage treatment may include performing the acid treatment of the third-stage treatment by using two-stage formic acid aqueous solutions with different concentrations, and the fourth-stage treatment may include adding water to the aforementioned third liquid material to reduce a concentration of the formic acid in the solution to about 20 wt % or lower.

In an embodiment, the fourth solid material may include nylon.

In an embodiment, the fourth liquid material may include acid liquid and nylon/degraded nylon, nylon suspension, or degraded nylon suspension dissolved in the acid liquid. A concentration of an acidic substance in the fourth liquid material is lower than a concentration of an acidic substance in the third liquid material.

[Recycling and Reuse of Nylon]

Recycling and reuse of nylon may be basically implemented on the second solid material and/or the fourth solid material including nylon in a suitable manner (such as nylon drawing or nylon granulation; but the disclosure is not limited thereto).

In an embodiment, the second solid material and/or the fourth solid material may be further washed with water to reduce the concentration of the acid liquid or other substances (such as decomposed or structurally modified organic dyes or decomposed or undecomposed oxidants, but the disclosure is not limited thereto) in the second solid material and/or the fourth solid material, but the disclosure is not limited thereto.

In an embodiment, the second solid material and/or the fourth solid material may be dried, but the disclosure is not limited thereto.

[Recycling and Reuse of Polyester]

Recycling and reuse of polyester may be basically implemented on the third solid material including polyester in a suitable manner (such as polyester granulation; but the disclosure is not limited thereto).

In an embodiment, the first solid material and/or the third solid material may be further washed with water to reduce the concentration of the acid liquid or other substances (such as decomposed or structurally modified organic dyes or decomposed or undecomposed oxidants, but the disclosure is not limited thereto) in the first solid material and/or the third solid material, but the disclosure is not limited thereto.

In an embodiment, the first solid material and/or the third solid material may be dried, but the disclosure is not limited thereto.

EXAMPLES AND COMPARATIVE EXAMPLE

The following examples and comparative example are shown to describe the disclosure, but not to limit the disclosure.

Example 1

A first-stage treatment: 20 grams (g) of polyester (PET)-nylon blended waste fabric (L=22%, 70% by weight of PET, 30% by weight of nylon) was put into a reaction tank of 1 liter (L), into which 50 g of water, 450 g of formic acid, and 1.5 g of sodium hypochlorite were then added. After the mixture was stirred at a temperature of 90° C. for 6 hours, the nylon dissolved or cracked, whereas the PET retained its fibrous structure. The temperature was lowered to 40° C., and the PET (i.e., the first solid material) and the nylon slurry (i.e., the first liquid material) were separated by a 3 mm screen.

A second-stage treatment: the nylon and the acid liquid in the nylon slurry (i.e., the first liquid material) were separated by a 20 micrometer (μm) screen, and the nylon powder (i.e., the second solid material) was washed with 12 g of water. The aforementioned acid liquid separated by the 20 μm screen and the water used for washing may be further collected (i.e., the second liquid material).

A third-stage treatment: The PET fibers (i.e., the first solid material) were placed on a 3 mm screen, washed with the second liquid material, and then washed with 28 g of water. The aforementioned washed PET fibers may be collected (i.e., the third solid material). The aforementioned second liquid used for washing and the water used for washing may be further collected (i.e., the third liquid material).

A fourth-stage treatment: the nylon and the acid liquid in the third liquid material were separated by a 1 μm screen to obtain the fourth solid material and the fourth liquid material.

The PET fiber (i.e., the third solid material) was dried at 105° C. for 2 hours. The weight ratio of the pure PET fabric was 99.5%; L=81%, a=1.2, b=6.4, which were beneficial for recycling.

The measurement of the pure PET weight ratio was carried out as follows. 600 cc of sulfuric acid aqueous solution with a concentration of 75% by weight was poured into a flask of 1000 cubic centimeters (cc), and 3 g of the PET fabric sample as separated was then obtained. After that, the flask was heated to 50±5° C. and maintained so for 1 hour, during which the flash was shaken 1 time every 10 minutes. When the above process was finished, the liquid is removed by suction using a funnel with a 3 mm screen, and 200 cc of sulfuric acid aqueous solution with a concentration of 75% by weight was poured into the funnel to wash the fabric and was then removed by suction. Then, 200 cc of clean water was poured into the funnel to wash the fabric twice, and the liquid is removed by suction each time. After that, the treated PET fabric was placed in an oven to be dried at 105° C. for 2 hours and was then weighed. 2.986 g of the PET fabric was obtained, confirming that the weight ratio of the pure PET fabric was 99.5%. As the other examples and the comparative example described as follows also adopted the same measurement, the same description will not be repeated herein.

Example 2

The steps or processes were similar to those in [Example 1], except that the formic acid was replaced by acetic acid. The weight ratio of pure PET fabric as obtained is 99.2%; L=80%, a=1.6, and b=7.2, which were beneficial for recycling.

Example 3

The steps or processes were similar to those in [Example 1], except that the sodium hypochlorite was replaced by calcium hypochlorite. The weight ratio of pure PET fabric as obtained is 99.6%; L=88%, a=0.8, and b=3.6, which were beneficial for recycling.

Comparative Example 1

A process similar to the first-stage treatment: 20 g of PET-nylon blended waste fabric (L=22%, 70% by weight of PET, 30% by weight of nylon) was put it into a 1 L reaction tank, into which 50 g of water and 450 g of formic acid were then added. After the mixture was stirred at a temperature of 90° C. for 6 hours, the nylon dissolved or cracked, whereas the PET retained its fibrous structure. The temperature was lowered to 40° C., and the PET (i.e., a material similar to the first solid material; abbreviated as: the quasi-first solid material) and the nylon slurry (i.e., a material similar to the first liquid material; abbreviated as: the quasi-first liquid material) were separated by a 3 mm screen.

A process similar to the second-stage treatment: the nylon and the acid liquid in the nylon slurry (i.e., the quasi-first liquid material) were separated by a 20 μm screen, and the nylon powder (i.e., a material similar to the second solid material; abbreviated as: the quasi-second solid material) was washed with 12 g of water. The aforementioned acid liquid separated by the 20 μm screen and the water used for washing may be collected (i.e., a material similar to the second liquid material; abbreviated as: the quasi-second liquid material).

A process similar to the third-stage treatment: The PET fibers (i.e., the quasi-first solid material) were placed on a 3 mm screen and washed with the quasi-second liquid material, and then 28 g of water were used to wash the PET fibers (i.e., a material similar to the third solid material; abbreviated as: the quasi-third solid material). The aforementioned quasi-second liquid material for washing and the water used for washing may be further collected (i.e., a material similar to the third liquid material; abbreviated as: the quasi-third liquid material).

A process similar to the fourth-stage treatment: the nylon and the acid liquid in the quasi-third liquid material were separated by a 1 μm screen to obtain a solid material similar to the fourth solid material (abbreviated as: the quasi-fourth solid material) and a liquid material similar to the fourth liquid material (abbreviated as: the quasi-fourth liquid material).

The PET fiber (i.e., the quasi-third solid material) was dried at 105° C. for 2 hours, and the weight ratio of the pure PET fabric was 99.3%; L=58%, a=2.4, b=8.9. PET fibers were grayish-yellow at this point and needed to be further decolorized for recycling.

INDUSTRIAL APPLICATION

By using the method of the disclosure, nylon or polyester in the recyclable may be recycled. In addition, the recycled nylon or polyester may be reused. The reuse method is, for example, but not limited to fabrication of fabrics, curtains, tires and other nylon-containing materials. The disposal method for recycled polyester includes physical reproduction or chemical reproduction. The physical reproduction includes using an extruder to melt the processed polyester and then extrude for pelletizing. The chemical reproduction includes using a chemical depolymerization solution to depolymerize the recycled polyester, and then repolymerizing monomers and/or oligomers obtained after depolymerization under specific conditions to perform granulating, where the chemical depolymerization solution may be water, methanol, ethanol, ethylene glycol, diethylene glycol or any combination thereof. The disposal method for the recycled polyester may be deduced by referring to Taiwan patent application No. 110113065 and/or U.S. patent application Ser. No. 17/320,247.

What is claimed is:

1. A disposal method for waste fabric containing polyester, nylon, and dye, comprising:
   step (a): providing a waste fabric containing polyester, nylon, and dye;
   step (b): performing a first-stage treatment on the waste fabric to obtain a first liquid material and a first solid material;
   step (c): performing a second-stage treatment on the first liquid material to obtain a second liquid material and a second solid material;
   step (d): performing a third-stage treatment on the first solid material to at least obtain a third liquid material and a third solid material; and
   step (e): performing a fourth-stage treatment on the third solid material to obtain a fourth liquid material and a fourth solid material, wherein the first-stage treatment comprises acid treatment with an acid liquid mixed with an oxidant, so as to decompose or decolorize the dye and to dissolve the nylon in the first stage treatment;

wherein the second-stage treatment comprises a dilution process;

wherein an acid concentration of the second liquid material is lower than an acid concentration of the first liquid material;

wherein the first solid material comprises recycled polyester;

wherein the first liquid material comprises recycled nylon or degraded nylon;

wherein a concentration of the oxidant used in the acid treatment of the first-stage treatment is 0.5 wt % to 10 wt %;

wherein the acid treatment in the first-stage treatment further comprises heating to 80° C. to 150° C.;

wherein based on a total amount of the nylon in the waste fabric, an amount of the nylon in the first liquid material is 75 wt % to 90 wt %, and an amount of the nylon in the first solid material is 25 wt % to 10 wt %;

wherein the third-stage treatment comprises an acid treatment;

wherein the fourth-stage treatment comprises a dilution treatment;

wherein an acid concentration of the fourth liquid material is lower than an acid concentration of the third liquid material;

wherein the third solid material comprises recycled polyester, or the fourth solid material comprises recycled nylon;

wherein the step (a), the step (b), the step (d) and the step (e) are performed N times, where N is greater than or equal to 2;

wherein the step (c) is performed M times, where M is less than or equal to N; and wherein the acid treatment of the N-th third-stage treatment comprises performing an acid treatment with the M-th second liquid material; or wherein the acid treatment of the N-th third-stage treatment comprises performing an acid treatment with the P-th fourth liquid, wherein P is smaller than N.

2. The disposal method for waste fabric containing polyester, nylon, and dye according to claim 1, wherein the acid used in the acid treatment of the first-stage treatment is formic acid or acetic acid.

3. The disposal method for waste fabric containing polyester, nylon, and dye according to claim 1, wherein the oxidant is an inorganic oxidant selected from the group consisting of hydrogen peroxide, permanganate, ozone, nitric acid, nitrate, chlorate, perchlorate, hypochlorite, perborate, dichromic acid salt, and combinations thereof.

4. The disposal method for waste fabric containing polyester, nylon, and dye according to claim 1, wherein an acid concentration of the acid used in the acid treatment of the first-stage treatment is 20 wt % to 95 wt %.

5. The disposal method for waste fabric containing polyester, nylon, and dye according to claim 1, wherein the acid treatment is performed at a temperature higher than a glass transition temperature of polyester.

6. The disposal method for waste fabric containing polyester, nylon, and dye according to claim 1, wherein in step (b), a weight ratio of the waste fabric to the acid liquid mixed with the oxidant ranges from 1:8 to 1:30.

7. The disposal method for waste fabric containing polyester, nylon, and dye according to claim 1, wherein the first-stage treatment takes 1 hour to 9 hours.

8. The disposal method for waste fabric containing polyester, nylon, and dye according to claim 1, wherein the recycled polyester has an L value of 75% or more, an a* value ranges from −4 to +4, and a b* value ranges from −8 to +8.

* * * * *